United States Patent [19]

Rhee

[11] 3,920,891

[45] Nov. 18, 1975

[54] PEAK DETECTOR AND SAMPLE AND HOLD CIRCUIT

[75] Inventor: Dong Woo Rhee, Williamsville, N.Y.

[73] Assignee: GTE Sylvania Incorporated, Stamford, Conn.

[22] Filed: Feb. 27, 1974

[21] Appl. No.: 446,397

[52] U.S. Cl. ........................................ 178/7.3 R

[51] Int. Cl.² ........................................ H04N 3/16

[58] Field of Search ......... 178/7.3 R, 7.3 S, 7.3 DC, 178/7.5 R, 7.5 DC, DIG. 26; 328/168, 172–175

[56] References Cited

UNITED STATES PATENTS 3,835,248 9/1974 Harford ........................ 178/7.5 DC

*Primary Examiner*—Benedict V. Safourek
*Assistant Examiner*—Robert Hearn
*Attorney, Agent, or Firm*—Norman J. O'Malley; Thomas H. Buffton; Cyril A. Krenzer

[57] ABSTRACT

In a signal receiver responsive to a composite video signal having pulse and video signals portion and having apparatus for providing a video signal, a peak detecting and current sampling means provides a signal representative of the peak level of the video signal and this signal is applied to a threshold detector means which holds the peak level of video signal for a time period after the peak level changes and cause operation of a switching means to effect a rapid change in the output of the peak detecting means to a new level when the given time period if expended. Thus, the video signal is employed to establish black, white, or chroma levels in a signal receiver.

13 Claims, 2 Drawing Figures

PEAK DETECTOR AND SAMPLE AND HOLD CIRCUIT

CROSS REFERENCE TO OTHER APPLICATIONS

A concurrently filed application entitled "Pulse Width Control And Advancing Circuit" bearing U.S. Ser. No. 446,596 and filed in the name of the present inventor relates to a technique for internal development of pulse signals having increased width and advanced with respect to a received signal. Also, a concurrently filed application entitled "Automatic Video Signal Control Circuit" bearing U.S. Ser. No. 446,396 and filed in the name of the present inventor relates to circuitry for developing black and white picture levels from peak black and combined average and peak white video signals.

BACKGROUND OF THE INVENTION

In general, peak detectors are responsive to the peak level of an applied signal and provide a substantially constant output representative of the peak signal level for an extended period of time. In other words, peak detectors normally function to provide a constant output potential representative of an applied peak potential.

To accomplish such a result, it is a common practice to employ a diode detector for charging a capacitor to provide the substantially constant output potential. Moreover, a high impedance is employed with the capacitor to provide a large time constant and a very slow rate of capacitor discharge. Thus, the output potential remains substantially constant for an extended period.

While peak detectors having relatively long time constants for effecting a relatively slow capacitor discharge and maintaining a relatively constant output potential have been and still are employed in numerous applications, there are other uses and circuits wherein such apparatus is not desirable. For example, receivers which are responsive to composite video signals wherein tracking of a peak signal potential is desired are deleteriously affected by a long time constant circuit providing a substantially constant output potential for an extended time period.

More specifically, an ordinary peak detector circuit will respond to the peak potential of an applied video signal to provide a given output potential. However, the relatively slow discharge time of the ordinary peak detector inhibits "tracking" of the peak potential for the applied video signal by the output potential. A decrease in the peak potential of the applied video signal is not ordinarily followed by a relatively rapid decrease in the output potential. Thus, ordinary peak detectors are unsatisfactory for peak detecting and providing output potentials representative of applied rapidly changing video signals.

OBJECTS AND SUMMARY OF THE INVENTION

An object of the present invention is to provide an improved television receiver. Another object of the invention is to provide enhanced peak signal detection. Still another object of the invention is to provide peak detecting and sample and hold circuitry with enhanced capability for tracking peak potentials of an applied video signal. A further object of the invention is to improve the rate of discharge capabilities of a peak detection circuit.

These, and other objects, advantages and capabilities are achieved in one aspect of the invention by a peak detecting and sample and hold circuit for a television receiver wherein means are provided for peak detecting and current sampling a video signal, coupling the current sampling means to a threshold detecting means which activates a switching means intermediate the peak detecting means and a potential reference level whereby changes in peak potential of an applied video signal are "tracked" by the output potential from the peak detecting means to provide black or white reference levels derived from the peak level of the video signal.

PREFERRED EMBODIMENT OF THE INVENTION

For a better understanding of the present invention, together with other and further objects, advantages, and capabilities thereof, reference is made to the following disclosure and appended claims in connection with the accompanying drawings.

Figure 1:
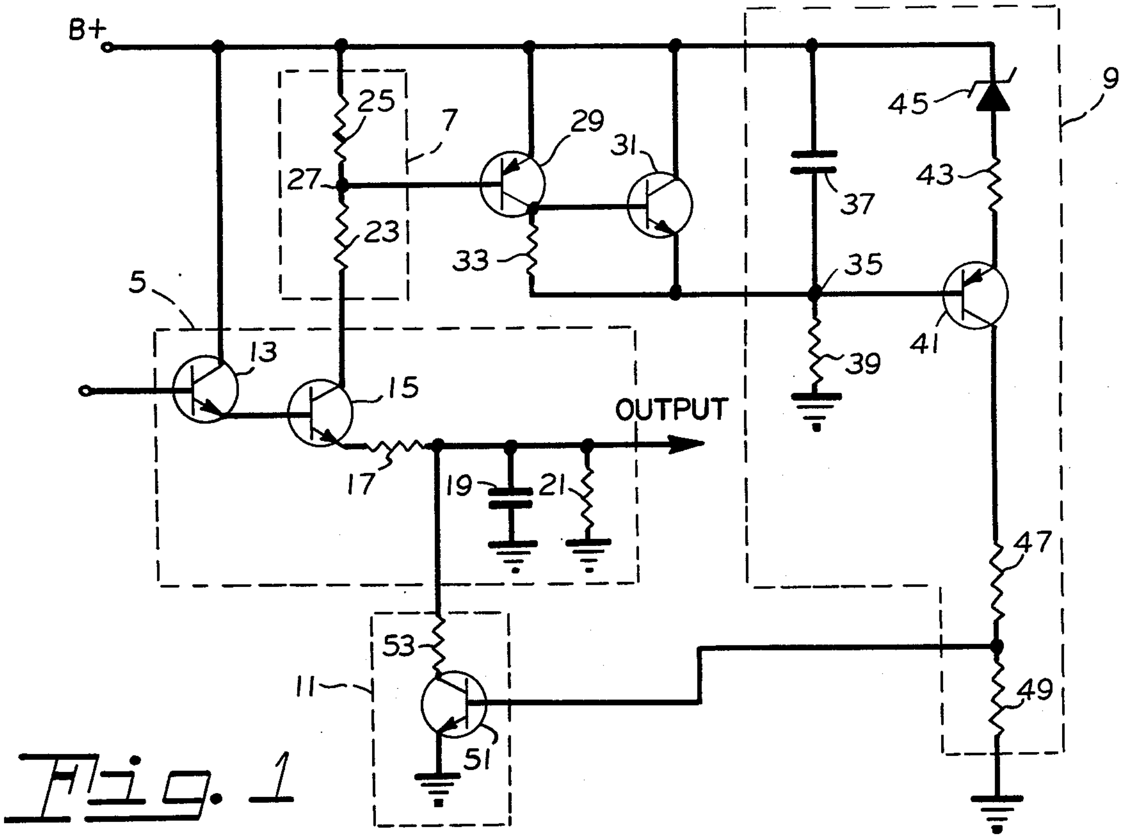
FIG. 1 is a preferred embodiment of a peak detector and sample and hold circuit.

In the drawings, FIG. 1 illustrates a preferred embodiment of a peak detecting and sample and hold circuit. Herein, a positive-going video signal is applied to a peak detecting circuit 5 having a current sampling means 7 coupled thereto. The current sampling means 7 is coupled via amplifier circuitry to a threshold detecting means 9 which is, in turn, coupled to switching circuitry 11 intermediate the peak detecting circuitry 5 and a potential reference level.

More specifically, a positive-going video signal is applied to the base of a transistor 13 having a collector electrode coupled to a potential source B+ and an emitter electrode connected to the base of a transistor 15. The transistor 15 has an emitter electrode connected by way of a resistor 17 to an output circuit and a parallel coupled capacitor 19 and resistor 21 connected to circuit ground.

The collector of the transistor 15 is connected by series connected resistors 23 and 25 to the potential source B+. The junction 27 of the series connected resistors 23 and 25 is coupled to amplifier circuitry and in particular to the base of a transistor 29. The transistor 29 has an emitter electrode coupled to the potential source B+ and a collector electrode connected to the base of a transistor 31 and via a resistor 33 to the emitter electrode of the transistor 31. The collector of the transistor 31 is connected to the potential source B+ while the emitter is coupled to the junction 35 of a capacitor 37 and resistor 39 series connected intermediate the potential source B+ and circuit ground. Also, the junction 35 is connected to the base electrode of a transistor 41 having an emitter coupled by a series connected resistor 43 and zener diode 45 to the potential source B+. The collector of the transistor 41 is connected to circuit ground by series connected resistors 47 and 49.

The junction of the series connected resistors 47 and 49 is coupled to the base electrode of a transistor 51. A collector electrode of the transistor 51 is coupled by a resistor 53 to the output of the peak detecting circuit 5.

Also, the emitter electrode of the transistor 51 is connected to a potential reference level, such as circuit ground in this instance.

As to operation, a positive-going video signal applied to the base electrode of the emitter-follower transistor 13 is coupled to the base of the peak detecting transistor 15. The peak detecting teansistor 15 responds to the applied signal to cause a fast charging of the capacitor 19 through the resistor 17 whereupon a relatively steady-state potential is provided at the output of the peak detecting circuit 5.

At the same time, collector current, which is the charge current for capacitor 19, flows through the transistor 15 and resistors 23 and 25 of the current sampling means 7. This collector current flow will reduce the potential at the base of the transistor 29 and turn on the transistor 29 of the amplifier circuitry. In turn, conduction of the transistor 29 will increase the potential at the base of the transistor 31 causing current flow therethrough and discharging of the capacitor 37.

This decrease in charge of the capacitor 37 also appears at the base of the transistor 41 whereupon the potential at the base electrode is greater than the potential at the emitter electrode and the transistor 41 is turned off. Upon reaching a turn-off condition of the transistor 41, the potential at the base of the transistor 51 is reduced and this transistor 51 is also turned off. Thus, the potential of the capacitor 19 and the output of the peak detecting means 5 remains substantially constant so long as a signal of a given peak potential is applied to the peak detecting circuit 5.

The above-described operation will continue as long as the peak video signal is applied to the peak detecting circuit 5. However, a reduction in the level of the applied video signal will render the transistors 13 and 15 of the peak detecting circuit 5 non-conductive because the base-emitter diode-section of the transistor 15 is reverse biased whereupon there will be no charging current available to the charge capacitor 19. Thereupon, the charge capacitor would normally discharge through the resistor 21 at a very slow rate due to the relatively long time constant circuit which includes the capacitor 19 and resistor 21.

However, this relatively slow rate of discharge of the charge capacitor 19 can be shortened by the sample and hold circuitry. Since the above-described transistors 13 and 15 of the peak detecting circuit 5 are rendered non-conductive when the peak level of the applied video signal is reduced, current flow through the resistors 23 and 25 of the current sampling means 7 will, in effect, be discontinued. Thereupon, the potential at the base of the transistor 29 of the amplifier circuitry will be increased and the transistor 29 turned off. In turn, turning off the transistor 29 will decrease the potential at the base of the transistor 31 whereupon it too will be turned off.

With the transistor 31 turned off, the capacitor 37 will charge to a potential sufficient to turn on the transistor 41. Accordingly, current flow through the transistor 41 will effect development of a potential at the base of the transistor 51 via the resistor 49. The transistor 51 will be turned on providing a discharge path to circuit ground for the capacitor 19. Thus, a rapid discharge of the capacitor 19 is provided whenever the magnitude of the applied video signal is decreased in peak potential value for a continued long period of time.

Further, the threshold detecting means 9 is preferably in the form of a hold circuit. Therein, the series connected capacitor 37 and resistor 39 are of a value such as to provide circuitry having a time constant whereby a potential sufficient to activate the transistor is provided in a period substantially equal to the duration of three vertical scan periods of a television receiver.

In other words, the peak detection circuitry works in a substantially normal manner to provide a relatively constant potential representative of the peak value of an applied signal. However, a decrease in value of the peak signal causes a decrease or, practically speaking an interruption, of current, in the current sampling means 7.

When this current flow in the current sampling means 7 is altered for a duration determined by the time constant and activating potential of the threshold detecting means 9, the threshold detecting means 9 acts to alter the switching circuitry 11. Thereupon, the charge capacitor 19 of the peak detecting circuit 5 is rapidly discharged via the transistor 51 of the switching circuitry 11 and the output of the peak detecting circuit 5 is altered to correspond to the shift in magnitude of the applied signal.

As previously mentioned, this time constant and actuating potential for the transistor 41 of the threshold detecting means 9 is preferably of a duration substantially eqaul to three vertical scan periods in a normal television receiver. Moreover, this time constant and actuating potential are readily determined by the values selected for the components, capacitor 37 and resistor 39 along with the transistor 41, of the threshold detecting means.

As an example of suitable values but in no way to be construed as limiting the invention, the following component values are suggested:

| | |
|---|---|
| R-17 | 300 |
| R-21 | 1-Meg |
| R-23 | 1-k |
| R-25 | 100-k |
| R-33 | 68-k |
| R-39 | 330-k |
| R-43 | 470- |
| R-47 | 1-k |
| R-49 | 10-k |
| R-53 | 1-k |
| C-19 | 2-ufd |
| C-37 | 0.22-ufd |

Figure 2:
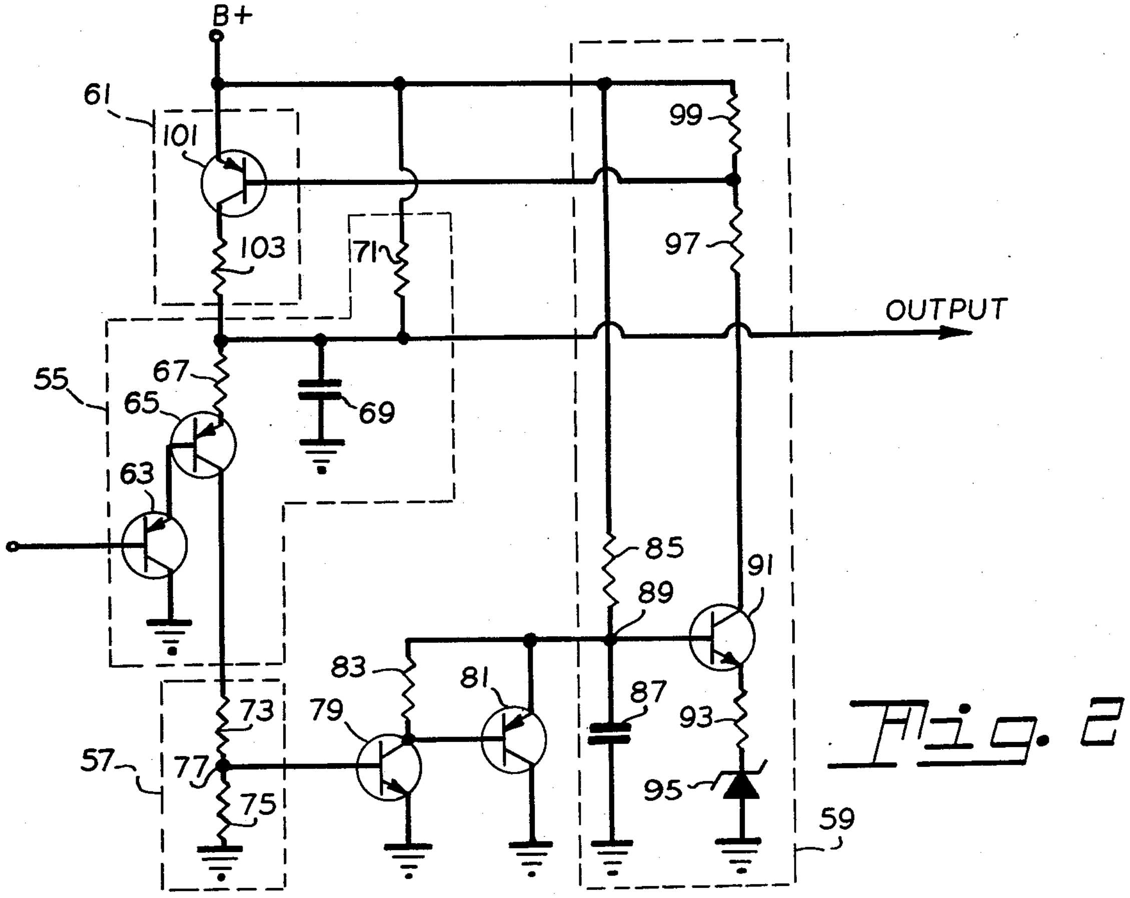
FIG. 2 is an alternate embodiment of a peak detector and sample and hold circuit responsive to signals of a polarity opposite to the polarity of the signal applied to the embodiment of FIG. 1.

Additionally, FIG. 2 illustrates an alternate embodiment of a peak detector and sample and hold circuit responsive to a signal of a polarity opposite to the polarity of the signal applied to the embodiment of FIG. 1. Herein, a negative-going signal is applied to a peak detecting circuit 55. The peak detecting circuit 55 has a current sampling means 57 coupled thereto. Also, the current sampling means 57 is coupled by way of amplifier circuitry, in this instance, to a threshold detecting means 59 which is, in turn, connected to a switching circuit 61. The switching circuit 61 interconnects the peak detecting circuit 55 and a potential source B+.

More specifically, a negative-going video signal is applied to the base of a first transistor 63 of the peak signal detecting circuit 55. The first transistor 63 has a collector connected to circuit ground and an emitter connected to the base of a second transistor 65. The second transistor 65 has an emitter connected by a first resistor 67 to the junction of a capacitor 69 and second resistor 71. The capacitor 69 is connected to circuit ground and the second resistor 71 is connected to a potential source B+ and to an output circuit.

The collector of the second transistor 65 is connected to circuit ground via first and second series connected resistors 73 and 75 of the current sampling means 57. The series connected resistors 73 and 75 have a junction 77 which is connected to the base of a transistor 79 serving as amplifier circuitry. The transistor 79 has an emitter connected to circuit ground and a collector coupled to the base of a second transistor 81 and via a resistor 83 to the emitter of the second transistor 81. The collector of the second transistor 81 is connected to circuit ground.

The threshold detecting means 59 has a series connected resistor 85 and capacitor 87 with a junction 89 therebetween. The resistor 85 is connected to the potential source B+. The capacitor 87 is connected to circuit ground while the junction 89 therebetween is connected to the emitter of the second transistor 81 of the amplifier circuitry and to the base of a transistor 91. The emitter of the transistor 91 is coupled to circuit ground by a series connected resistor 93 and zener diode 95. The collector of the transistor is connected to the potential source B+ by a pair of series connected resistors, 97 and 99 respectively.

The junction of the pair of series connected resistors 97 and 99 is connected to the base of a transistor 101 of the switching circuit 61. The emitter of the transistor 101 is connected to the potential source B+ while the collector is coupled by a resistor 103 to the junction of the resistor 67 and capacitor 69 of the peak detecting circuit 55.

Operation of this embodiment is similar to the operation previously described with respect to FIG. 1 except to provide compensating components for the oppositely poled signal applied to the circuitry. Herein, a negatively-poled video signal is applied to the base of the first transistor 63 of the peak detecting circuit 55. This signal is coupled to the base of the second transistor 65 whereupon the capacitor 69 is charged to a potential representative of the peak potential level of the applied signal. This peak potential level appears at the output of the circuitry.

At the same time, collector current, that is representative of the charge current of the capacitor 69, will flow through the second transistor 65 developing a potential at the junction 77 of the resistor 73 and 75 and turning on the transistor 79. In turn, the turning on of transistor 79 will decrease the base potential turning on the transistor 81 which will cause current flow through the transistor 81 whereby the capacitor 87 is discharged. When the capacitor 87 discharges, the transistor 91 of the threshold detecting means 59 is turned off which, in turn, causes the transistor 101 of the switching circuit 61 to be turned off. Thus, the charge of the capacitor 69 remains relatively constant and the output potential from the circuitry remains at a relatively constant level.

The above-described operation will continue so long as the peak input signal is available to the peak detecting circuit 55. However, when the applied signal of negative-going polarity decreases or becomes less negative, there will be no charge current available to the capacitor 69 since the potential at the base of the second transistor 65 will be greater than the potential at the emitter. Thus, the capacitor 69 would normally discharge at a relatively slow rate through the resistor 71.

As previously mentioned with respect to FIG. 1, a slow rate of discharge of the peak detector circuit 55 is deleterious to a desired rapid response to changes in an applied signal. When the applied negative-going signal becomes less negative, current flow through the current sampling means 57 will cease or at least decrease an appreciable amount. This absence of current flow will cause the transistors 79 and 81 of the amplifier circuitry to turn off. Thus, the discharge path for the capacitor 87 will be discontinued and the capacitor 87 will be charged from the potential source B+ via the resistor 85.

When the capacitor 87 reaches a given threshold potential, the transistor 91 of the threshold detecting means 59 will be turned on. Thereupon, current will flow through the series connected resistors 97 and 99 decreasing the base potential whereupon the transistor 101 of the switching circuit 61 will be turned on. Thus, a path for rapid discharging of the capacitor 69, via the transistor 101, will be provided whereupon the potential appearing at the output circuit will follow the magnitude and direction of change of an applied signal.

Additionally, the threshold detecting means 59 includes a hold circuit in the form of a resistor 85 and capacitor 87 which are of a value such that the threshold potential needed to alter the conduction of the transistor 91 is attained in a period substantially equal to three vertical scan periods of a television receiver. Obviously, the selection of the conduction altering or threshold attainment period is readily altered by selection of values of the resistor 85 and capacitor 87 of the hold circuitry.

Thus, there has been provided a unique peak detecting and sample and hold circuit suitable for use with a video signal. The circuitry not only detects the peak value of an applied signal but also samples and holds an output signal so long as the peak signal level is maintained. When this peak signal level decreases, provision is made, after three vertical scan periods have been reached, for rapid discharge of the peak detecting circuit and a shift in the output of the circuitry to correspond to the shift in applied signal. Moreover, the time required to effect such a shift in output from the circuitry is readily determinable.

While there has been shown and described what is at present considered the preferred embodiment of the invention, it will be obvious to those skilled in the art that various changes and modifications may be made therein without departing from the invention as defined by the appended claims.

What is claimed is:

1. In a television receiver utilizing a video signal source, a peak detecting and sample and hold circuit comprising:

peak detecting and current sampling means coupled to said video signal source and providing a signal representative of the peak level of the video portion of said video signal;

threshold detecting means coupled to said sampling means, said means holding said signal representative of said peak level of said video portion of said video signal for a time period after said peak level of said video portion of said video signal changes; and switching means coupled to said threshold detecting means and intermediate said peak detecting means and a potential reference level, said switching means effecting a shift in output of said peak detecting means in accordance with a change in potential from said threshold detecting means as determined by variations in current flow in said current sampling means.

2. The peak detecting and sample and hold circuit of claim 1 wherein said peak detecting means includes a transistor means coupled to said video signal source and in series connection with said sampling means and said switching means intermediate a potential source and potential reference level.

3. The peak detecting and sample and hold circuit of claim 1 wherein said threshold detecting means includes a capacitor and resistor connected intermediate a potential source and potential reference level and a transistor means coupled to the junction of said capacitor and resistor and intermediate said potential source and potential reference level.

4. The peak detecting and sample and hold circuit of claim 1 wherein said switching means is in the form of an electron device connecting said peak detecting means to a reference potential and having a control electrode coupled to said threshold detecting means.

5. The peak detecting and sample and hold circuit of claim 1 wherein said peak detecting means includes a charge capacitor and said switching means provides a path for alteration in the charge on said charge capacitor in accordance with current flow through said current sampling means.

6. The peak detecting and sampling and hold circuit of claim 1 including amplifier means coupling said sampling means to said threshold detecting means.

7. The peak detecting and sampling and hold circuit of claim 1 wherein said threshold detecting means includes a capacitor and resistor series connecting a potential source and potential reference level and a transistor coupled to the junction of said capacitor and resistor and in series connection with a zener diode and resistor intermediate said potential source and potential reference level.

8. In a television receiver utilizing a video signal source, a peak detecting and sample and hold circuit comprising:

means coupled to said signal source for peak detecting the video portion of said video signal for sampling the presence and absence of current flow in said peak detecting means to indicate a shift in peak video signal portion level;

means coupled to said means for sampling the presence and absence of current flow in said peak detecting means for detecting and holding for a given period a threshold potential in accordance with said presence of current flow and altering said threshold potential in the absence of current flow in said peak detecting means; and means coupled to said means for detecting and holding for a given period a threshold potential and intermediate said means for peak detecting said video portion of said video signal and a potential reference level for altering the output of said means for peak detecting said video portion of said video signal in accordance with said presence and absence of current flow in said peak detecting means as indicated by said sampling means.

9. The peak detecting and sample and hold circuit of claim 8 wherein said means for peak detecting said video signal includes an electron device coupled to said signal source and to a charge capacitor.

10. The peak detecting and sample and hold circuit of claim 8 wherein said means for sampling the presence and absence of current flow in said peak detecting means includes an impedance coupling said peak detecting means to a potential reference.

11. The peak detecting and sample and hold circuit of claim 8 wherein said means for detecting a threshold potential includes a resistor and capacitor series connected intermediate a potential source and potential reference level with a junction therebetween coupled to a transistor in series connection with a diode and resistor intermediate said potential source and potential reference level.

12. The peak detecting and sample and hold circuit of claim 8 wherein said means for peak detecting said video signal is in the form of a chroma signal peak detector.

13. The peak detecting and sample and hold circuit of claim 8 wherein said means for altering the output of said means for peak detecting said video signal is in the form of an electronic switch.

* * * * *